United States Patent [19]

Tarng

[11] Patent Number: 5,076,185
[45] Date of Patent: Dec. 31, 1991

[54] TANGS CYCLEBOARD

[76] Inventor: Min M. Tarng, 1367 Glenmoor Way, San Jose, Calif. 95129

[21] Appl. No.: 451,998

[22] Filed: Dec. 18, 1989

[51] Int. Cl.⁵ .............................................. B63B 43/14
[52] U.S. Cl. .................... 114/39.2; 114/101; 114/363; 440/31
[58] Field of Search ................ 440/8, 37, 38, 21, 26, 440/27, 31; 114/39.1, 39.2, 123, 363, 101, 102; 135/88, 98, 20 R, 22, 25 R, 48

[56] References Cited

U.S. PATENT DOCUMENTS

| | | | |
|---|---|---|---|
| 1,104,428 | 7/1914 | Kertesz | 440/8 |
| 2,147,958 | 2/1939 | Angers | 114/363 |
| 2,319,999 | 5/1943 | Jennings | 114/39 |
| 3,212,470 | 10/1965 | Wiggin | 440/8 |
| 3,473,176 | 10/1969 | Taylor | 114/363 |
| 3,487,800 | 1/1970 | Schweitzer et al. | 114/39.2 |
| 3,858,542 | 1/1975 | Lenoble | 114/103 |
| 4,004,543 | 1/1977 | Cox | 440/31 |
| 4,371,346 | 2/1983 | Vidal | 440/8 |
| 4,382,417 | 5/1983 | Talve | 114/102 |
| 4,457,724 | 7/1984 | Miyamoto | 440/38 |
| 4,522,600 | 6/1985 | Jost | 440/8 |
| 4,558,655 | 12/1985 | Debarge | 114/39.2 |
| 4,598,659 | 7/1986 | Chinnery | 114/39.2 |
| 4,653,416 | 3/1987 | Debarge | 114/39.2 |

FOREIGN PATENT DOCUMENTS

| | | | |
|---|---|---|---|
| 53993 | 5/1981 | Japan | 440/8 |
| 640605 | 1/1984 | Switzerland | 440/8 |
| 2032371 | 5/1980 | United Kingdom | 440/8 |

Primary Examiner—Jesus D. Sotelo
Assistant Examiner—Stephen P. Avila

[57] ABSTRACT

Surf board has multiple functions to serve as the sail boat, surf board, wind surf board, canoe and the rest seat on water. It comprises a foldable revolving sail, water wings, single sided pedals, water turbine, water jet nozzle, the foldable reclining seat and board with removable canoe cover. The revolving sail drives the horizontal water turbine to generate the water jet. The water jet may swivel to propel the surf board in different direction. The revolving sail also serves as the sunshade umbrella. The foldable revolving sail adopts the flexible parafoil sail. If the wind is weak, the rider steps on the single sided pedals to rotate the water turbine to propel the board. Furthermore, the revolving sail and water wings lift the board to glide in the air and land softly.

26 Claims, 20 Drawing Sheets

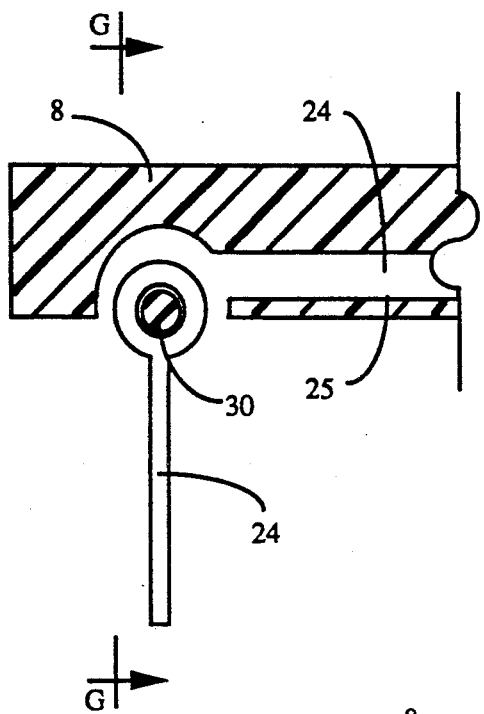
FIG. 15
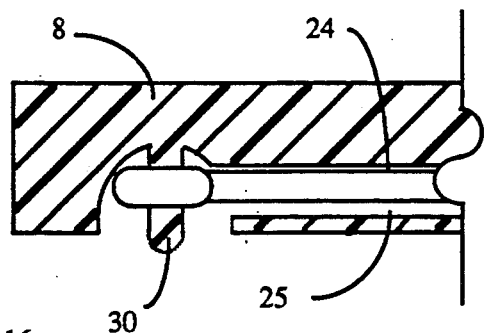
FIG. 16
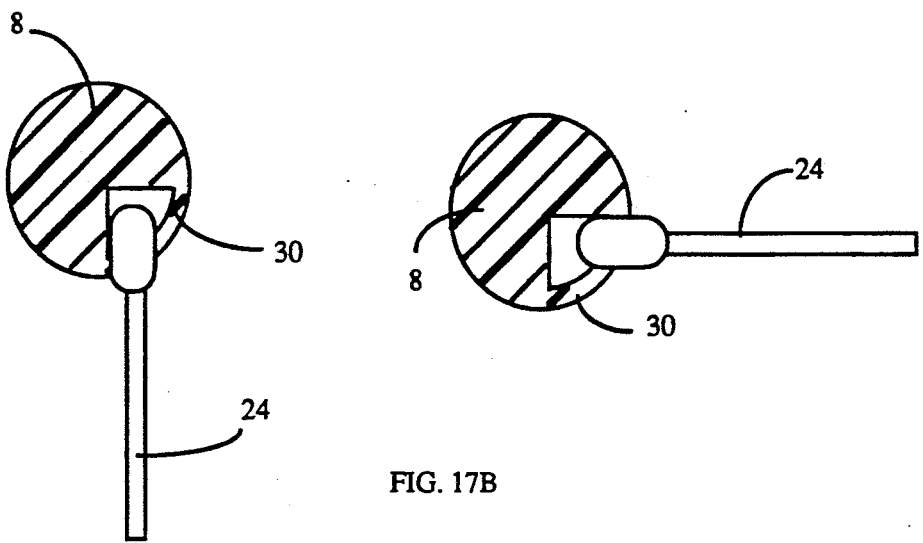
FIG. 17A
FIG. 17B

TANGS CYCLEBOARD

INTRODUCTION

The most popular water sport is the wind surf board. The wind surf board combines the sail boat with surf board. The rider has the close contact with water. It has much more fun than the sail boat. However, the surf board limits to sportsmen. The rider struggles with the strong wind with his whole body weight. He cannot relax on the water. It makes recreational people feel very uncomfortable.

The Tangs surf board is invented for both sport and recreation. It has the multiple function of sail boat with revolving fan, the relax seat on water with sunshade umbrella, the surf board with self-propelling water jet and the canoe with pedal wheel. It can serve as the wind surf board. However, the rider needs not to hold the sail as the surf board rider does. The Tangs revolving sail converts the wind energy to the water jet to propel the board. The rider needs not to adjust the sail according to the wind direction, either. The revolving sail has the same efficiency despite of the direction of wind. The transform efficiency of wind energy is high, we may use much smaller sail. The overturn torque is much smaller. Furthermore, the revolving sail has the automatic adjustment capability to avoid the overturn torque in the very strong wind. The floating water wings and damper fins help to maintain the stability of the board. The rider needs not to struggle for the balance with the weight of body. The rider can be relaxed to enjoy life.

The Tangs surf board may serve as the surf-board. However, the rider no longer needs to swim out of beach with the surf board and wait for the wave coming in the sea. The water-jet propels the surf board. The surf rider can even run against and climb over the wave.

With the removable canoe cover, the board can be transformed into a canoe. The water turbine is horizontal and hide in the board and the water wing and damper fin are horizontally aligned. The surf board has the direct access to the very shallow water region. If there is no wind, the rider may step on the single sided pedals to rotate the water turbine to propel the board and/or to rotate the revolving sail. The parafoils of revolving sail serves as the fan blowing the wind on the rider. The revolving sail serves as the sunshade umbrella, too. Equipped with the revolving sail and the foldable reclining seat on board, the rider can ride and rest on board. It is the best water sport and recreational apparatus.

SUMMARY OF THE INVENTION

The Tangs surf board comprises the revolving sails, single sided pedals, water turbine and the multi-functional board. The revolving sail rotates to drive the horizontally aligned water turbine. The turbine propels the board forward. Stepping on the single-sided pedals, the water turbine rotates to propel the board, too. As the foldable reclining seat is in folded position, the board serves as the wind surf board. With the automatically foldable revolving sail, extendable floating wing and damper fins, the board is stable to be operated in the strong wind. As the foldable reclining seat is in raised position, the board serves as the relaxation seat or sail boat. The revolving sail serves as the sunshade umbrella, too. Equipped with the canoe cover, the board is transformed into a canoe.

BRIEF DESCRIPTION OF THE DRAWINGS

FIG. 15 is the enlarged partially exposed section view of the alternative design taken at the end of cantilever in FIG. 13.

FIG. 16 is the partially exposed section view of the brace link hidden in the bracket bar in the folded up position of revolving sail.

FIG. 17 is the partially exposed section view of the brace link of the parafoil as shown in FIG. 13: (A) is the brace link in the vertical position taken at the G—G line in FIG. 15; (B) is the brace link in the horizontal position.

DETAILED DESCRIPTION OF PREFERRED EMBODIMENTS OF THE INVENTION

Figure 7:
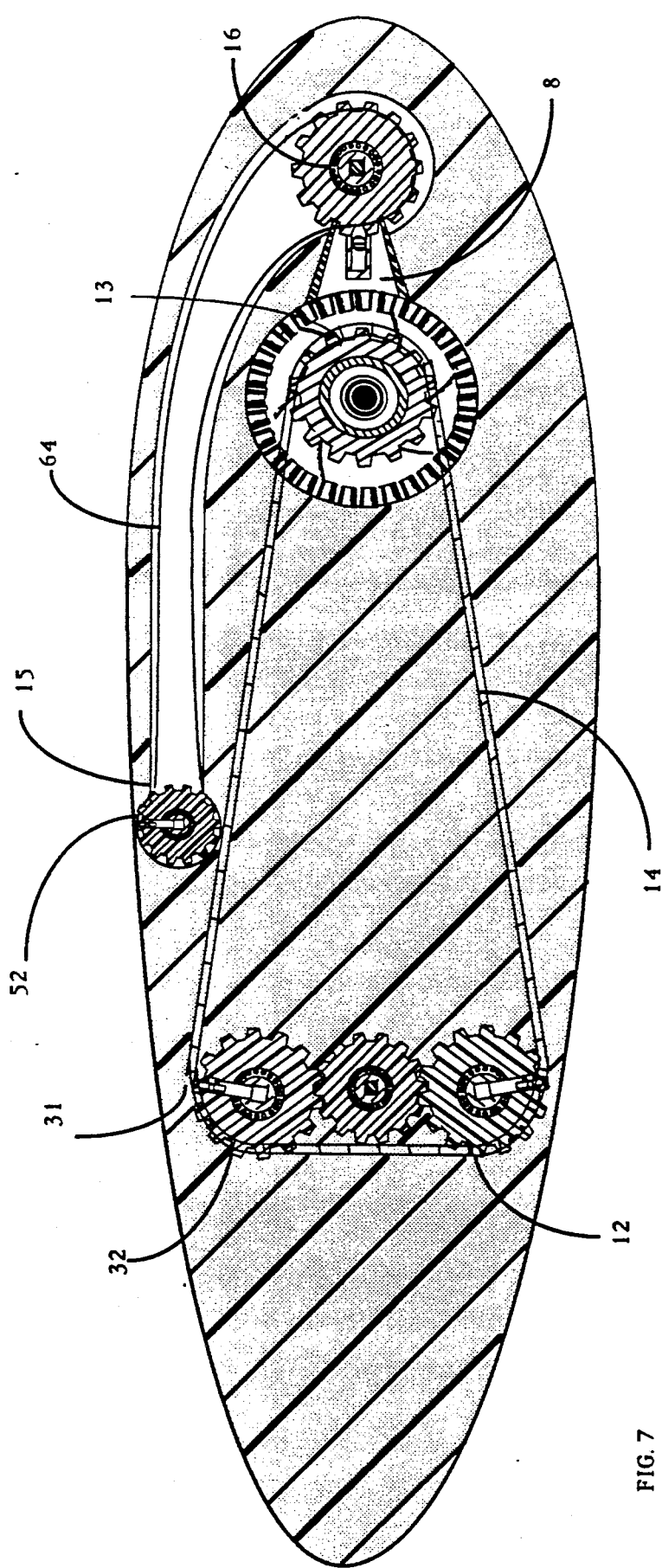
FIG. 7 is the section view of the Tangs surf board in the form of canoe taken at the C—C line in FIG. 5.
Figure 8:
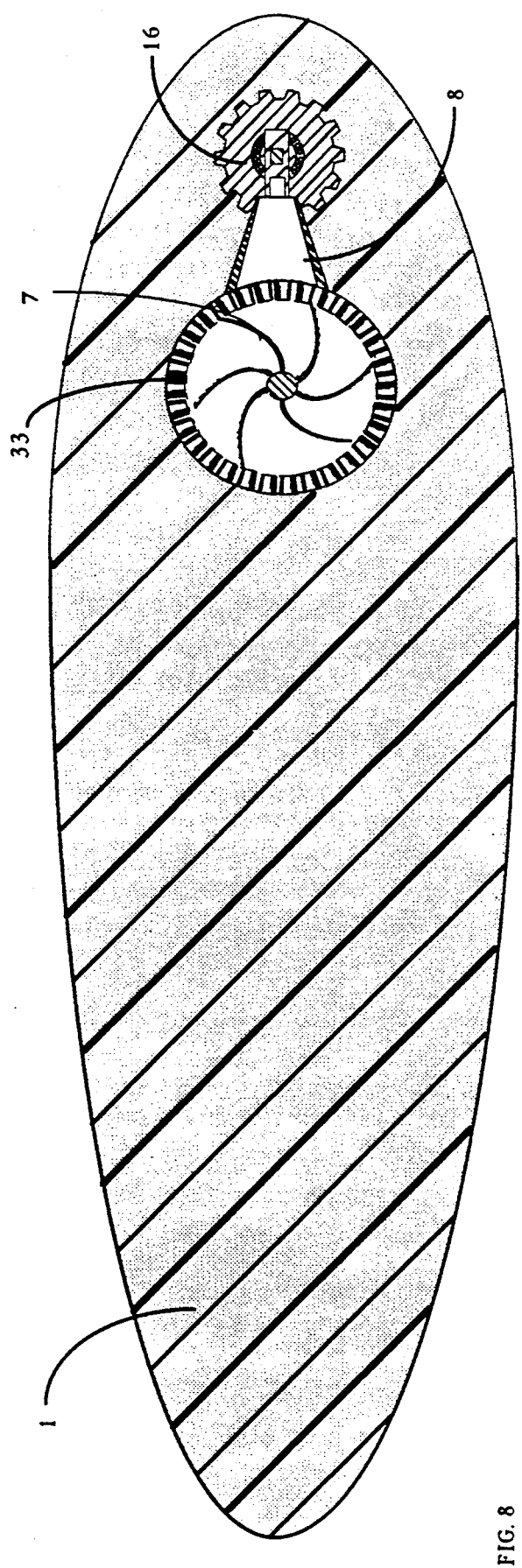
FIG. 8 is the partially exposed bottom view of the Tangs surf board in the form of canoe.
Figure 9:
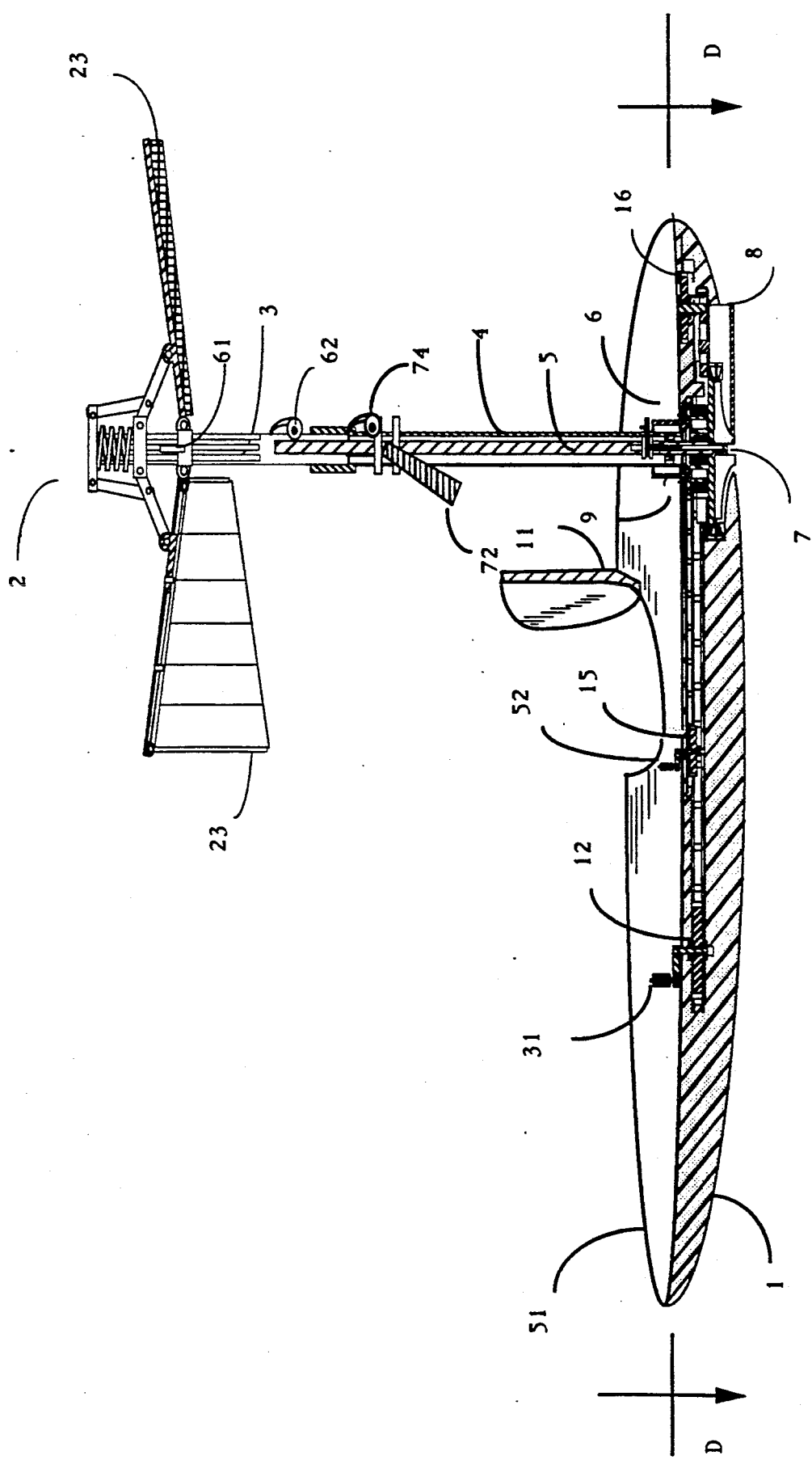
FIG. 9 is the partially exposed section view of the Tangs surf board in the form of canoe; the revolving sail is the operating position.
Figure 10:
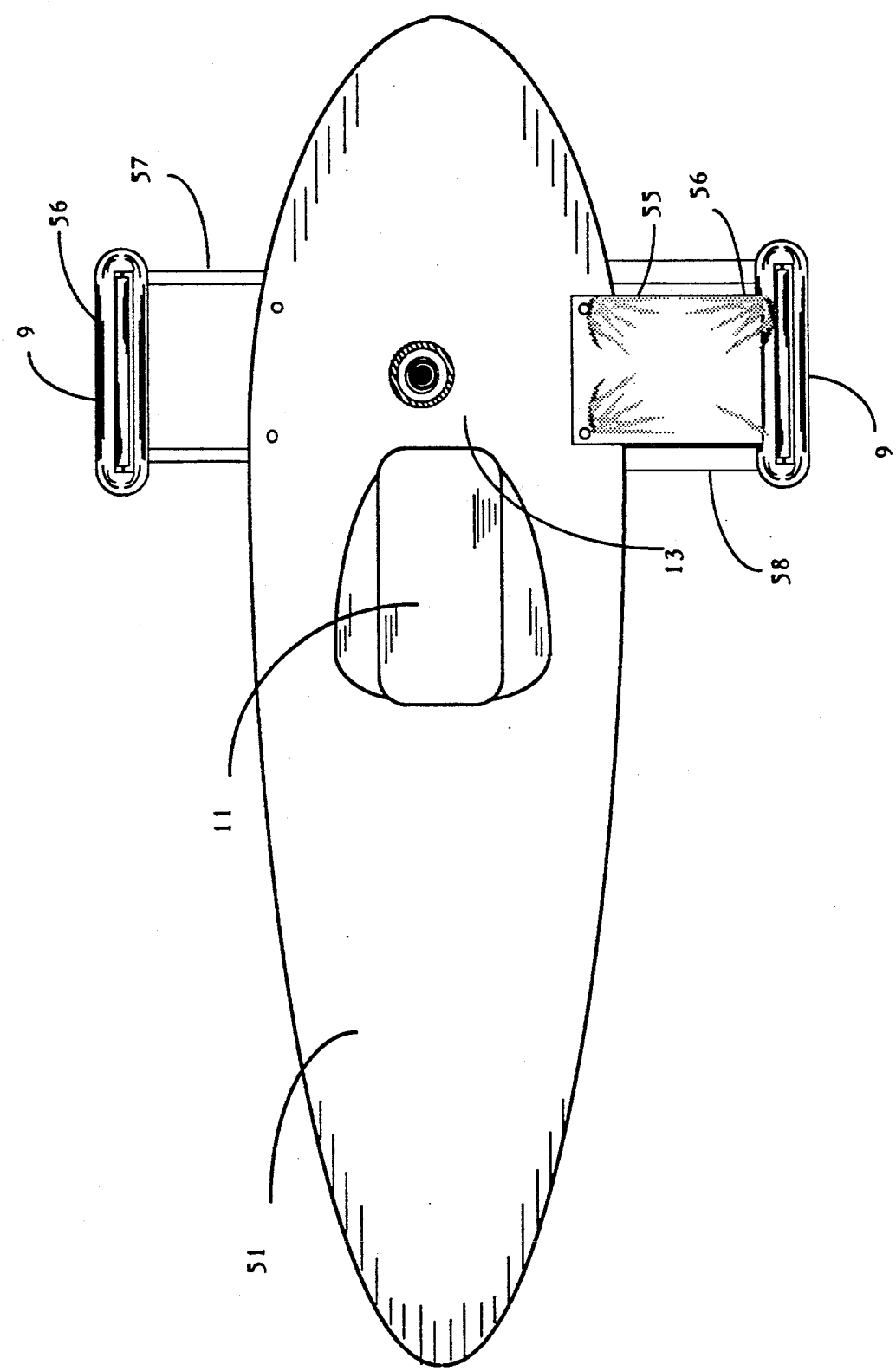
FIG. 10 is the partially exposed top view of the Tangs surf board in the form of canoe; the water wings are in the extended position.
Figure 11:
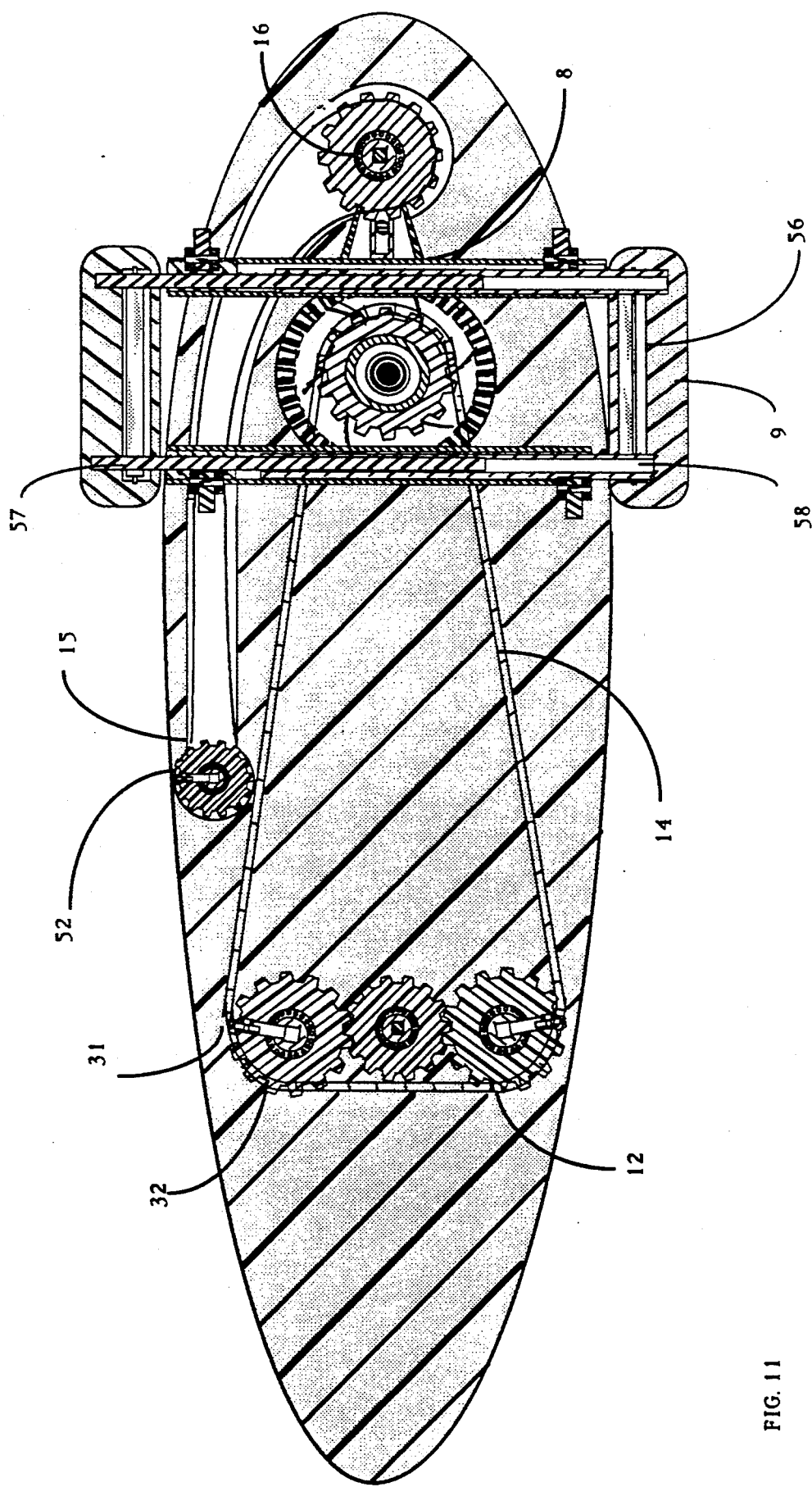
FIG. 11 is the partially exposed section view of the Tangs surf board taken at the D—D line in FIG. 9; the water wings are in the closed position.

The Tangs surf board has the multiple functions of canoe, rest seat, sail boat and wind surf board. The Tangs surf board uses the revolving sail and/or the flat single sided pedals to drive the horizontal water turbine to propel forward. With the removable canoe cover, the board may be changed into a canoe. There are several different combinations of the surf board. FIGS. 1, 2, 3 and 4 show the board equipped with the revolving sail and pedals. FIGS. 5, 6, 7 and 8 show the canoe equipped with pedals. FIGS. 9, 10 and 11 show the sail boat equipped with revolving sail and pedals.

Figure 1:
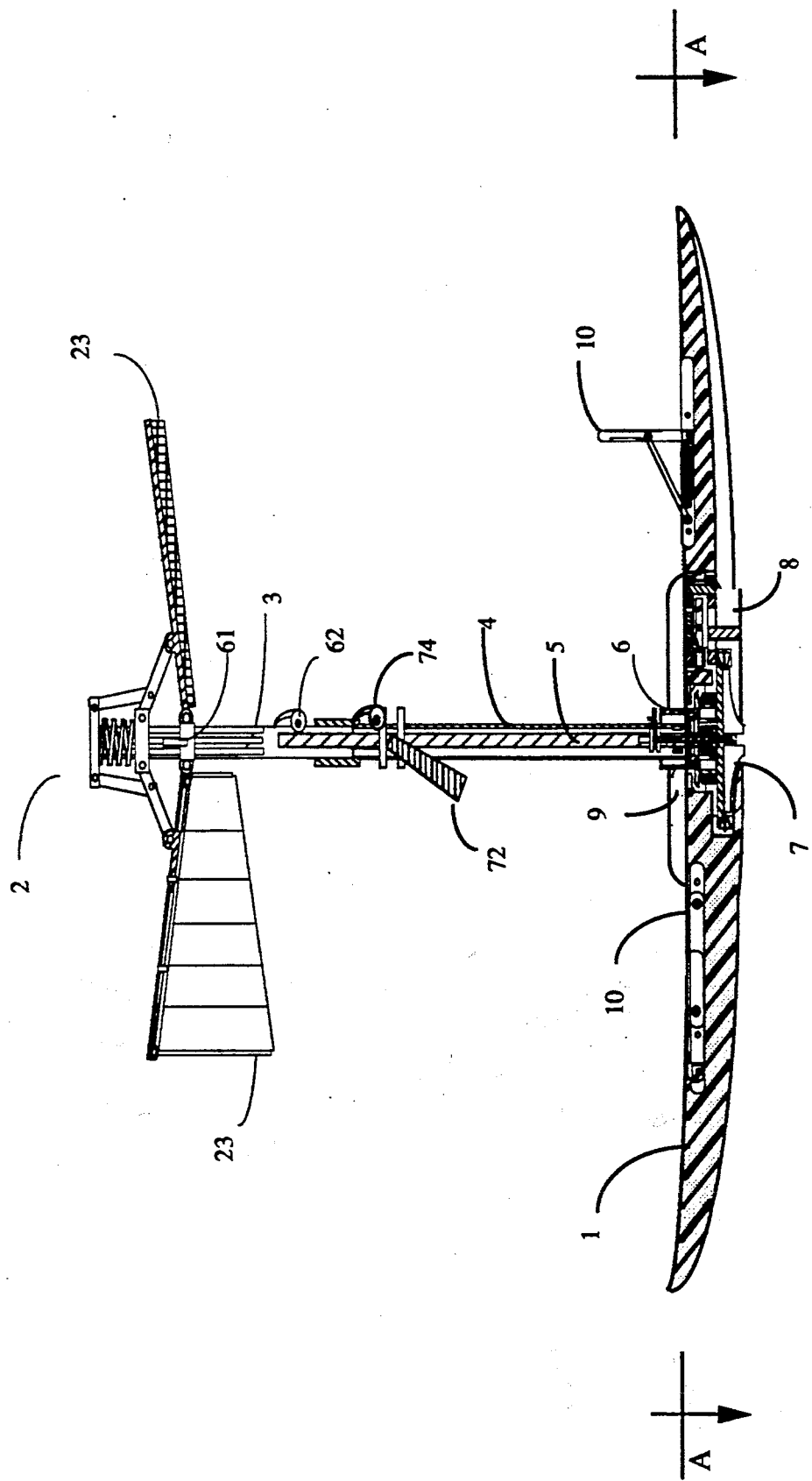
FIG. 1 is the partially exposed section view of the Tangs surf board with the revolving sail in the operating position; one foldable seat is in the raised position; the other seat is in the folded position.
Figure 3:
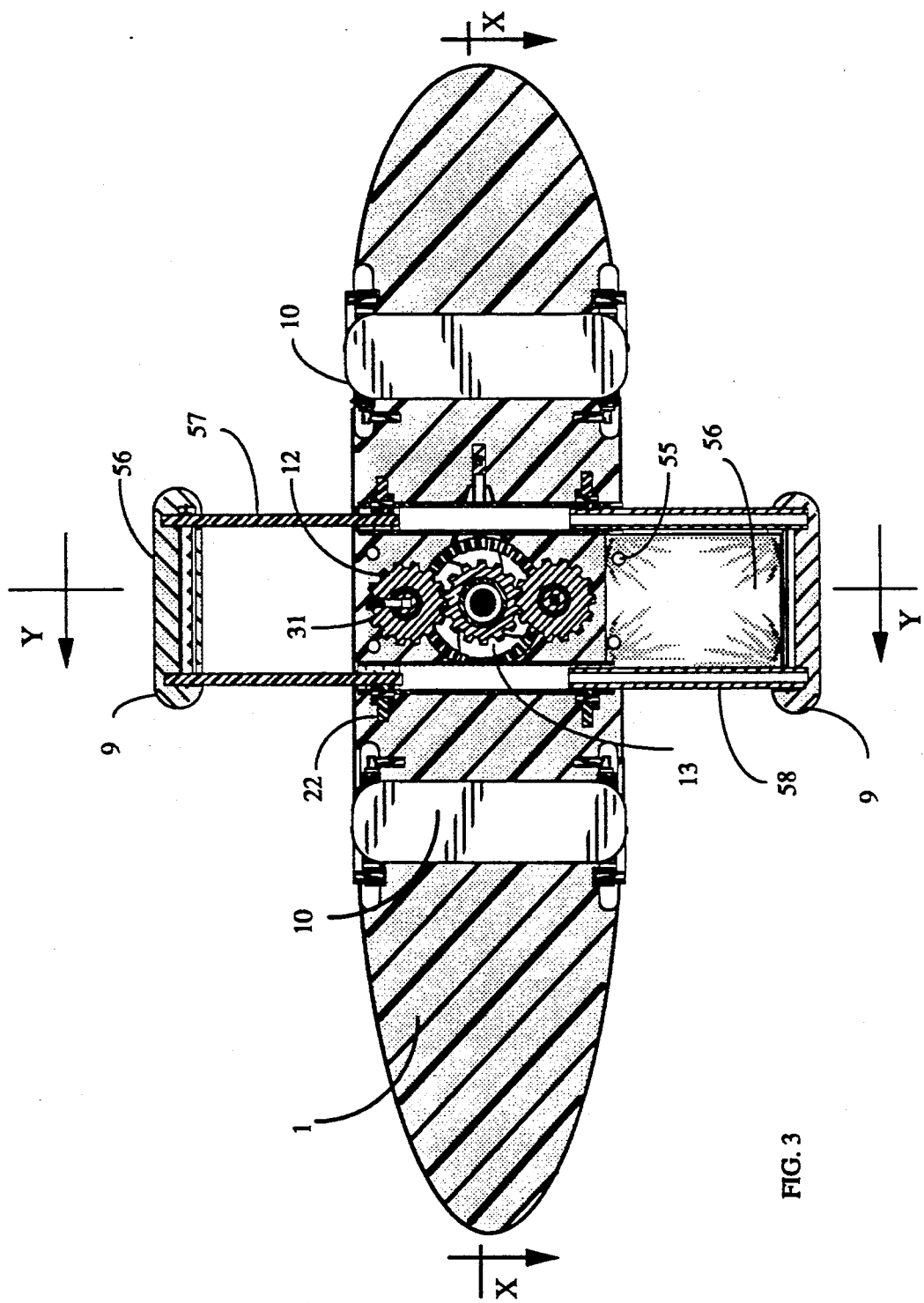
FIG. 3 is the top section view of the surf board taken along the line A—A in FIG. 1; the water wings are in the extended position.

Referring to FIG. 1 and FIG. 3 the Tangs surf board comprises of the board 1, revolving sail 2, pedals 31, water turbine 7, water jet 8, water wings 9, damping fins 56 and foldable seats 10. The water turbine 7 is horizontally aligned and within the board 1. The seat 10 may be folded that the board may serve as either the surf board or rest seat. The wind blows the revolving sail 2 to rotate. The turbine 7 transforms the rotation of transmission axle 5 into the water jet. The water nozzle 8 transforms the water pressure into the water velocity. The handle 72 is rotationally mounted on the fixed mast 4 for the rider to hold. Release the lock 74, the handle 72 may slide on the mast 4 to adjust the position of handle 72.

Figure 12:
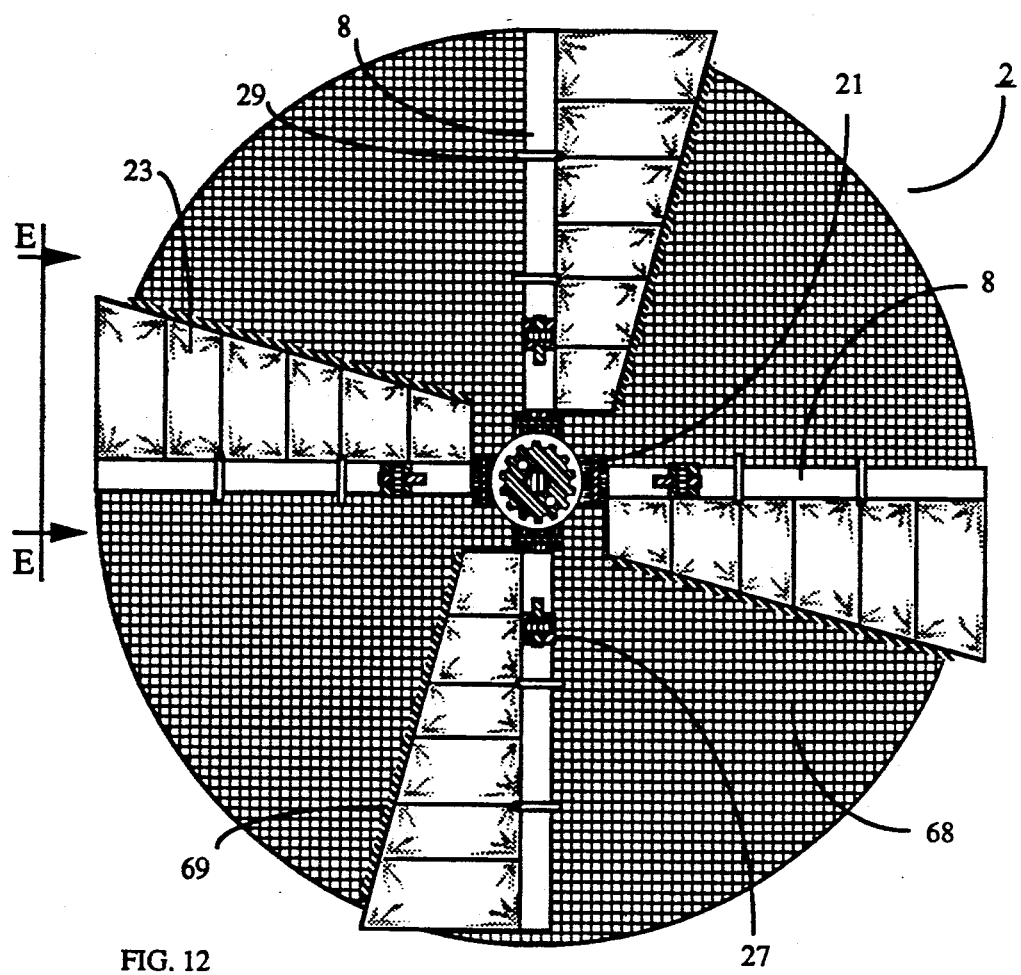
FIG. 12 is the partially exposed top view of the revolving sail; the tails of parafoils are sewed to the umbrella cover with the zippers.
Figure 14:
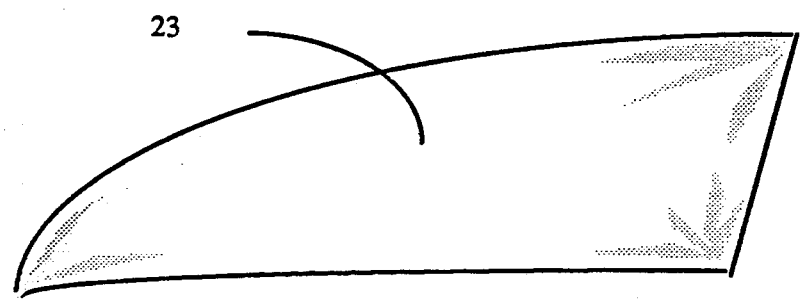
FIG. 14 is the side view of parafoil sail taken at the line E—E in FIG. 12 and F—F line in FIG. 13.
Figure 13:
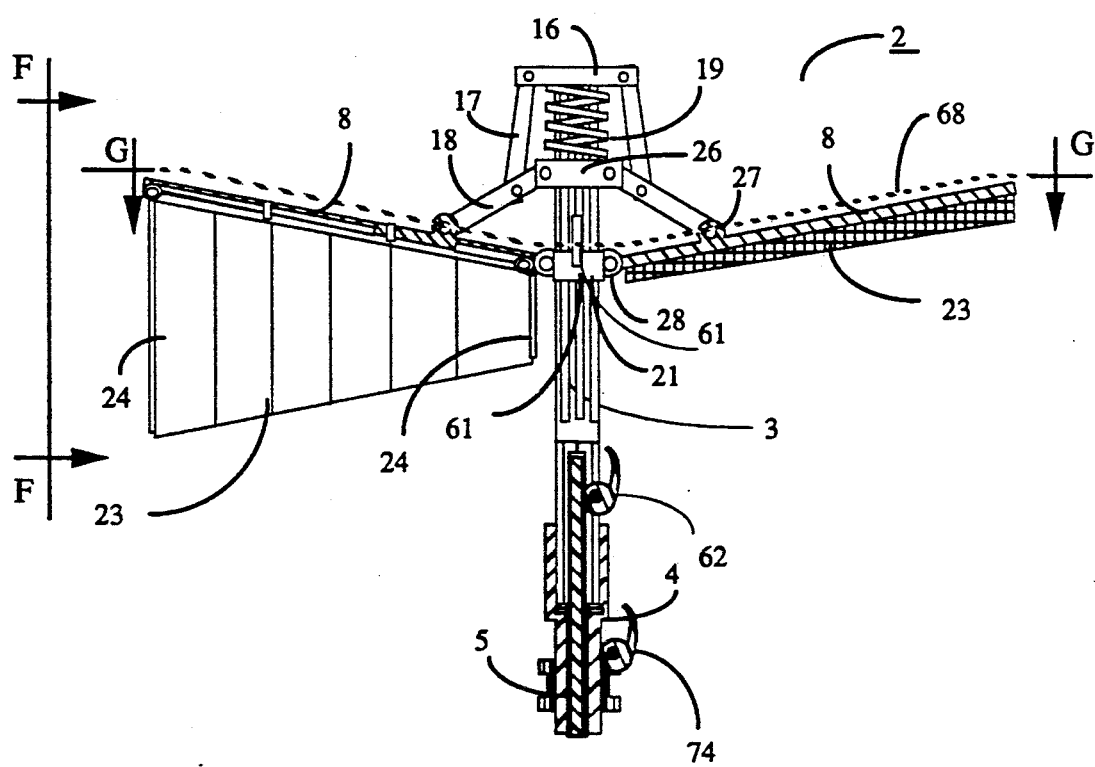
FIG. 13 is the partially exposed section view of the alternative design of revolving sail; the parafoils swings between the vertical and horizontal positions.

FIG. 12 and FIG. 13 show the detailed structures of two different designs for the revolving sail 2. Similar to the umbrella, covering on the cantilevers 8 is the alcove cover 68. The alcove cover 68 is made of gauze. It offers shade to the rider, transmits the rotating torque to pole 3, minimizes the overturning torques and lifts the board 1 to increase the speed. The flexible sail 23 is preferred to be implemented with the parafoil as shown in FIG. 14. The flexible sails 23 hang on the cantilevers 8. As shown in FIG. 12, the revolving sail 2 attaches the tail of parafoil 23 to the alcove cover 68 with the zipper 69. This design is much simpler and has the same efficiency as the design as shown in FIG. 13, 15, 16 and FIG. 17. In such a design, the brace links 24, hook 30 and notches 25 in FIG. 16 are eliminated.

FIG. 13 shows the alternative design of the revolving sail 2. The cantilever 8 is hinged to the sliding ring 21 and is pivoted at the tip of the rocker arm 18. The rocker arm 18 is hinged to the spring retainer 26 and pivoted at the tip of the stirrup 17. There are two spring retainers 16 and 26 clamping the coil spring 19. The spring retainer 16 tamps the end of pole 3 to hold the coil spring 19. The coil spring 19 expands against the spring retainer 26 and the spring retainer 26 moves downward. The rocker arms 18 raise the cantilevers 8. The sliding ring 21 moves upward. The revolving sails 2 are in the extended position as shown in FIG. 13. There are two brace links 24 at the ends of flexible sail 23. As shown in FIG. 15 and FIG. 17(A), the brace link 24 hangs on the hook 30 at the end of cantilever 8. FIG. 17(A) is the side view taken along the line G—G in FIG. 15. As shown in FIG. 17(A) and (B), the brace link 24 can swing from vertical position in FIG. 17(A) to the horizontal position in FIG. 17(B) and vice versa. The cantilevers 8 hold the revolving sails 23. The cantilevers 8 are hinged to the sliding cylinder 21.

As shown in FIG. 13, as the wind blows in the direction pointing into the paper, the left flexible sail 23 expands and its brace links 24 are vertical; the right flexible sail 23 becomes flat and its brace links 24 become horizontal. It causes the revolving sail 2 rotating in a single direction. This rotation transmits through the pole 3, axle 5 and the water turbine 7 to propel the board 1. The sliding cylinder 21 mounts on the driving pole 3. The pole 3 is installed at the top of the fixed mast 4. The pole 3 rotates the axle 5. The axle 5 drives the water turbine 7 to rotate. The lock handle 61 is to lock the revolving sail 2 with the pole 3. The lock handle 62 is to lock the pole 3 with the axle 5. If the lock handle 61 is released, the revolving sail is released to slide on the pole 3. If the lock handle 62 is released, the revolving sail 2 rotates freely. To increase the torque transmitting capability, the sliding cylinder 21 and the driving pole 3 have the grooves.

Figure 2:
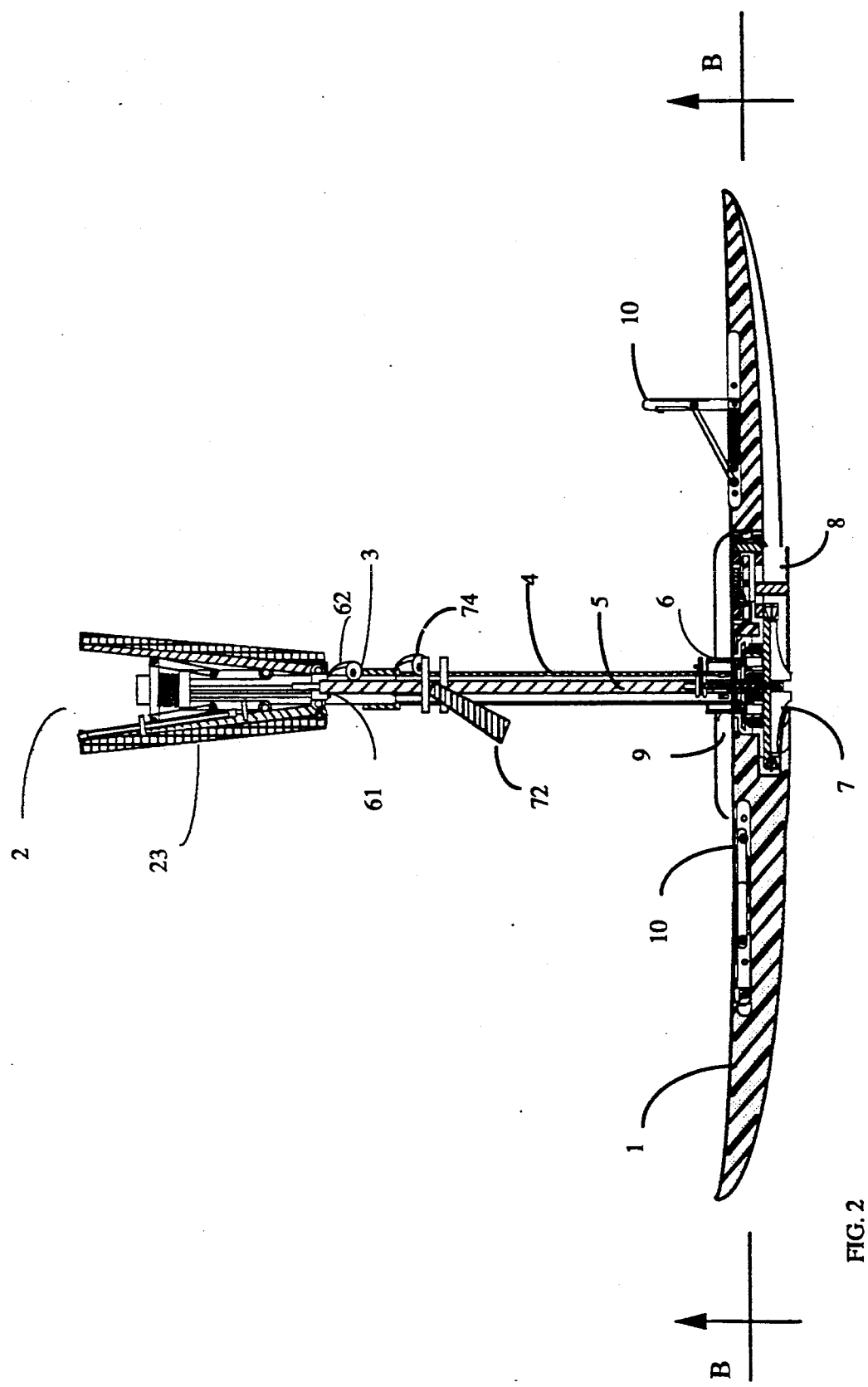
FIG. 2 is the partially exposed section view of the Tangs surf board with the revolving sail in the folded up position.
Figure 18:
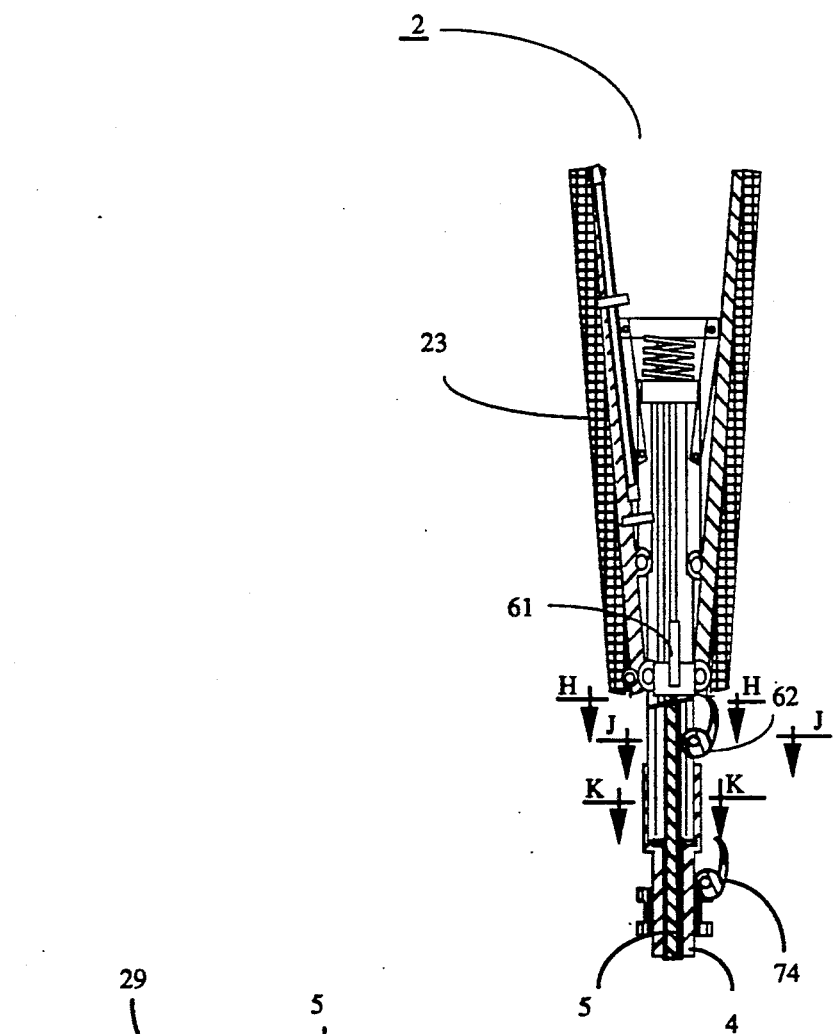
FIG. 18 is the partially exposed section view of the revolving sail in the folded up position.
Figure 19A:
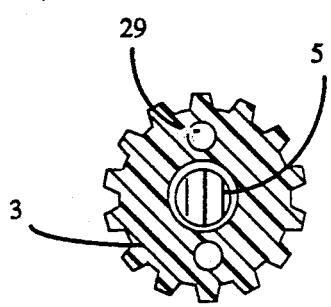
FIG. 19 (A) is the section view of the pole taken at the line H—H in FIG. 18; (B) is the section view of the pole taken at the line J—J in FIG. 18; (C) is the section view of the pole taken at the line K—K in FIG. 18.
Figure 19B:
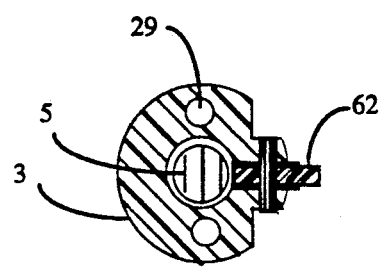
Figure 19C:
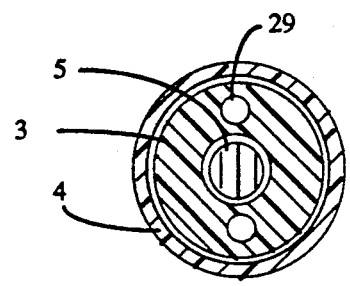

There are several different ways to operate the revolving sail 2. As shown in FIG. 1, the revolving sail 2 serves as the sail, umbrella and rotating fan. As the sliding cylinder 21 is pulled downward, the revolving sail 2 is folded up as shown in FIG. 2. The rider may enjoy the direct sunshine and/or fishing in the lake. As shown in FIG. 18, pulling the sliding ring 21 downward, the revolving sail 2 folds up. The flexible sails 23 are wrapped as the umbrella. As shown in FIG. 16, the brace links 24 fit in the slots 25 in the cantilever 8. FIG. 19(A) is the cross section taken at the H—H line in FIG. 18; FIG. 19(B) is the cross section taken at the J—J line in FIG. 18; FIG. 19(C) is the cross section taken at the K—K line in FIG. 18. As shown in FIG. 19(A), (B) and (C), there are the grooves 29 inside the pole 3. These grooves 29 are to collect the rain to flow down through the mast 4.

Figure 4:
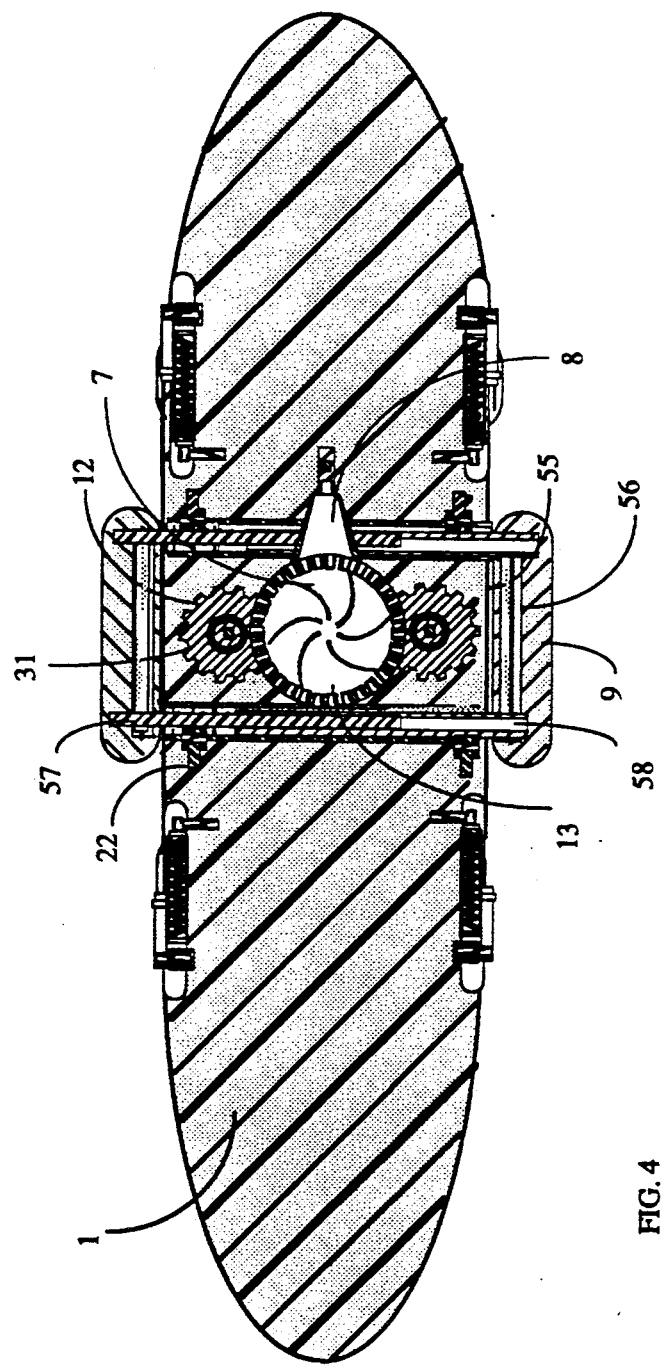
FIG. 4 is the bottom section view of the surf board taken at the line B—B in FIG. 2; the water wings are in the closed position.

FIG. 3 is the partially exposed top view of the board taken along the line A—A in FIG. 1. The water wings 9 are in the extended positions. The left damper fin 56 is hinged to the buckles 55. The right damper fin 56 is still wrapped as a roll. The sleeve tubes 57 and 58 are locked with the cam lock 22. The sleeve tubes 57 and 58 share the same conduits. The tube 57 may slide inside the tube 58. As shown in FIG. 4, the sleeve tubes 57 and 58 may shrink to the closed position.

Figure 20:
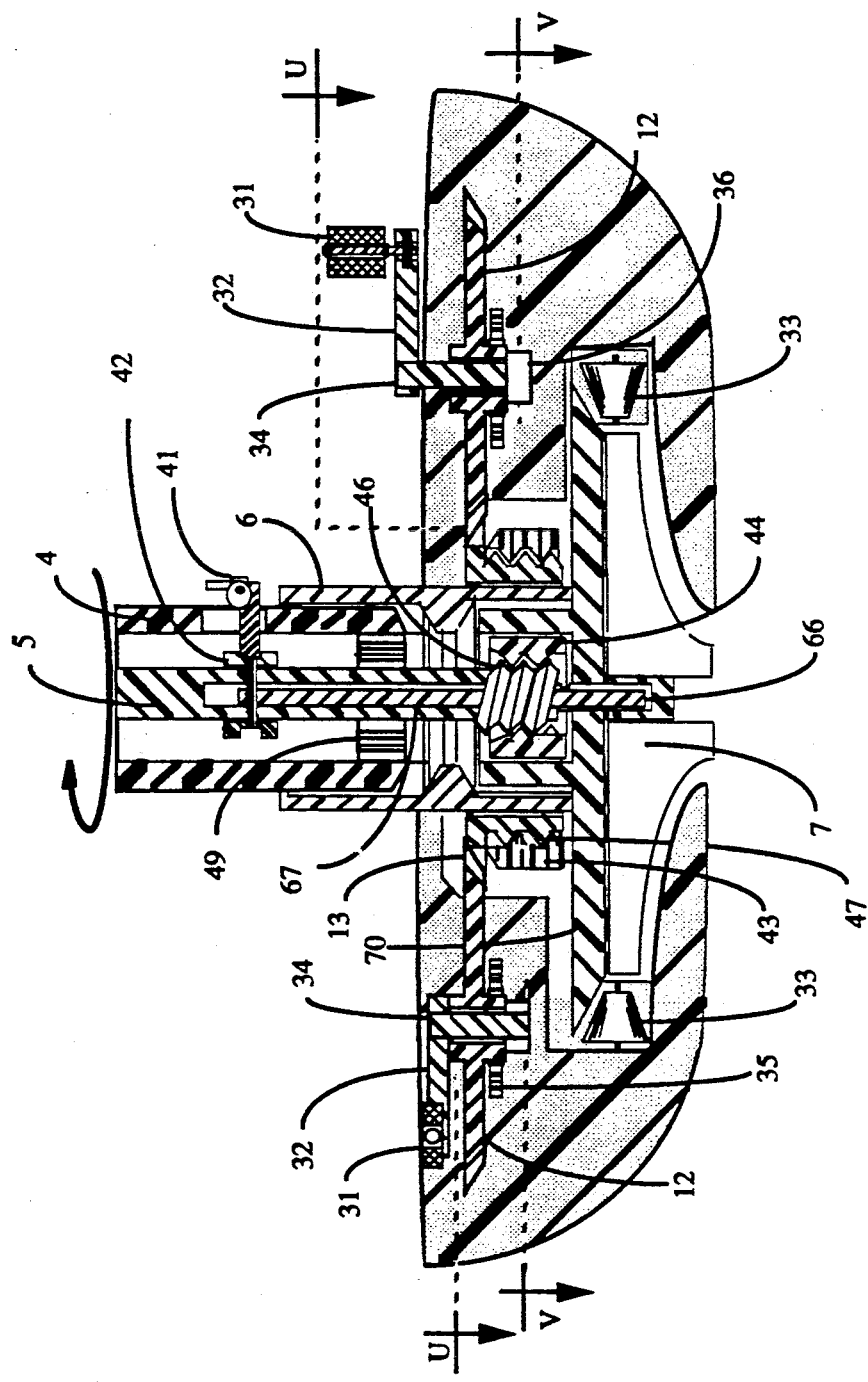
FIG. 20 is the enlarged partially exposed section view of the driving mechanism taken at the Y—Y line in FIG. 3.
Figures 21, 22:
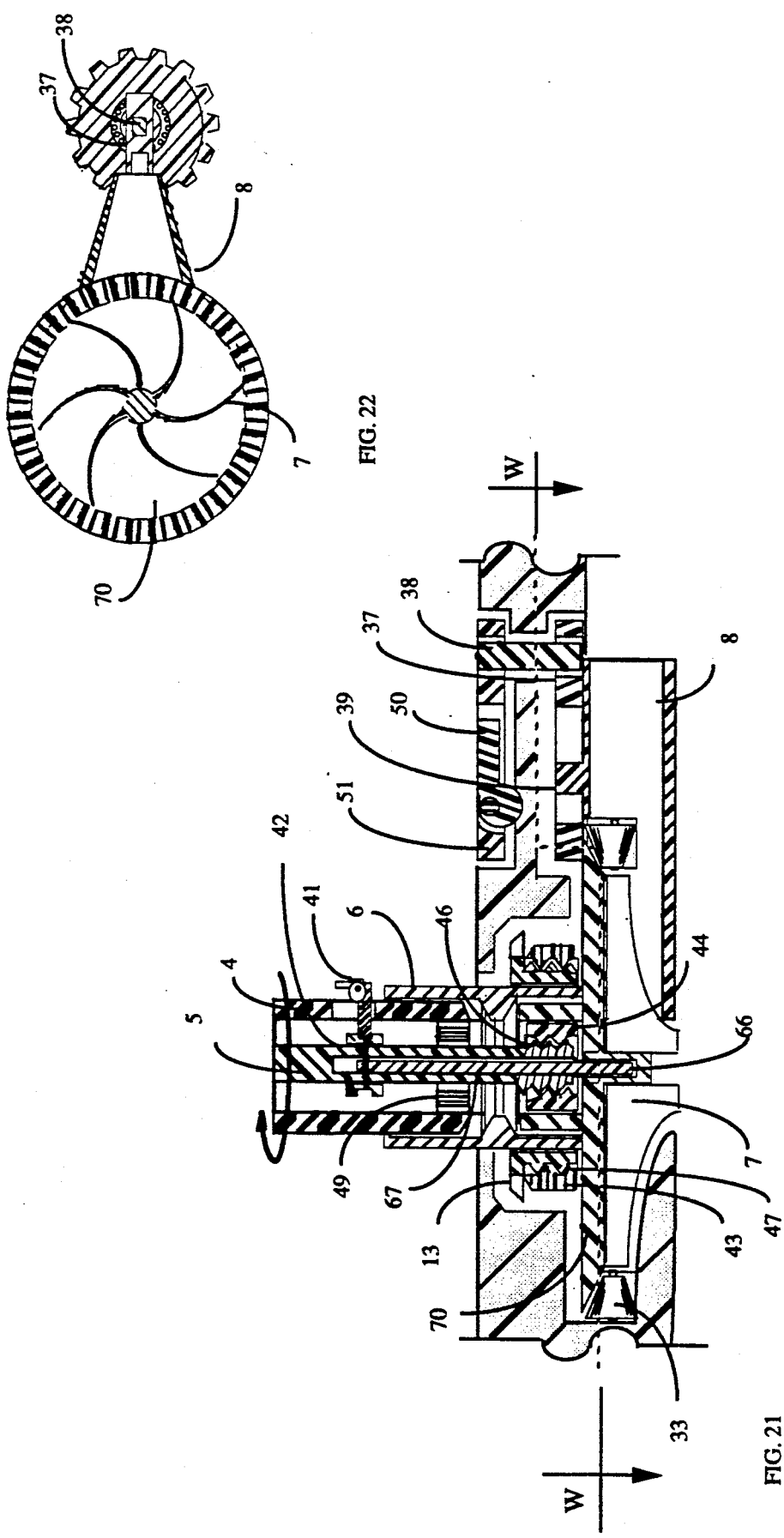
FIG. 21 is the enlarged partially exposed section view of the driving mechanism taken at the X—X line in FIG. 3.
FIG. 22 is the enlarged partially exposed bottom view of the water turbine and jet nozzle in FIG. 4.
Figure 23:
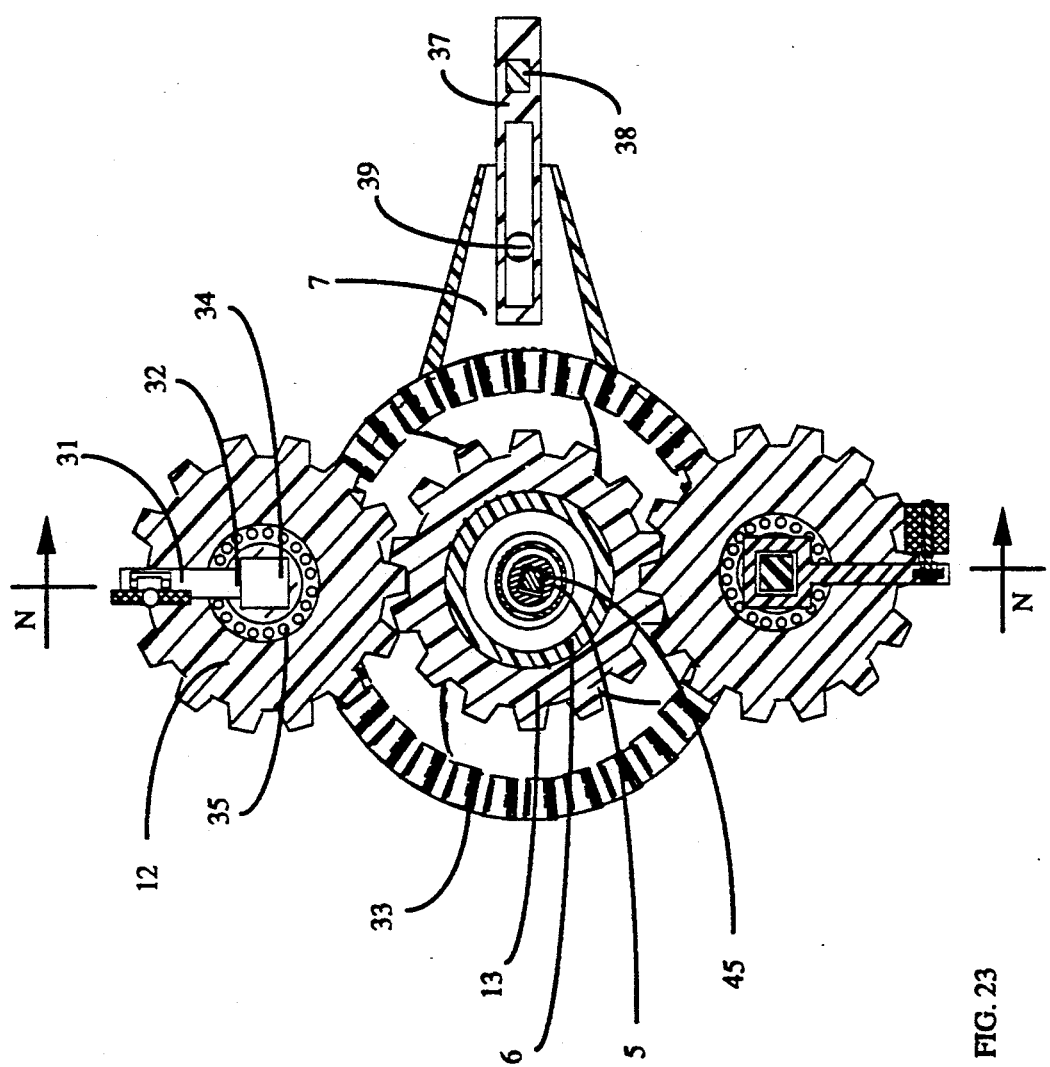
FIG. 23 is the enlarged partially exposed top view of the driving mechanism in FIG. 3.
Figure 24B:
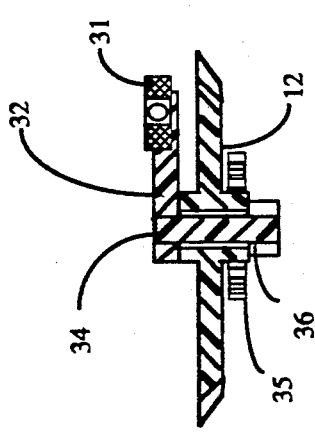
FIG. 24 is the section views of the pedals; (A) is the pedal in the pulled out driving position; (B) is the pedal in the pushing-in folded position.
Figure 24A:
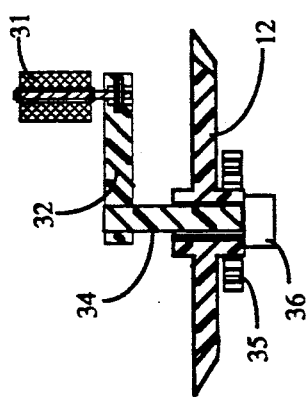
Figure 25:
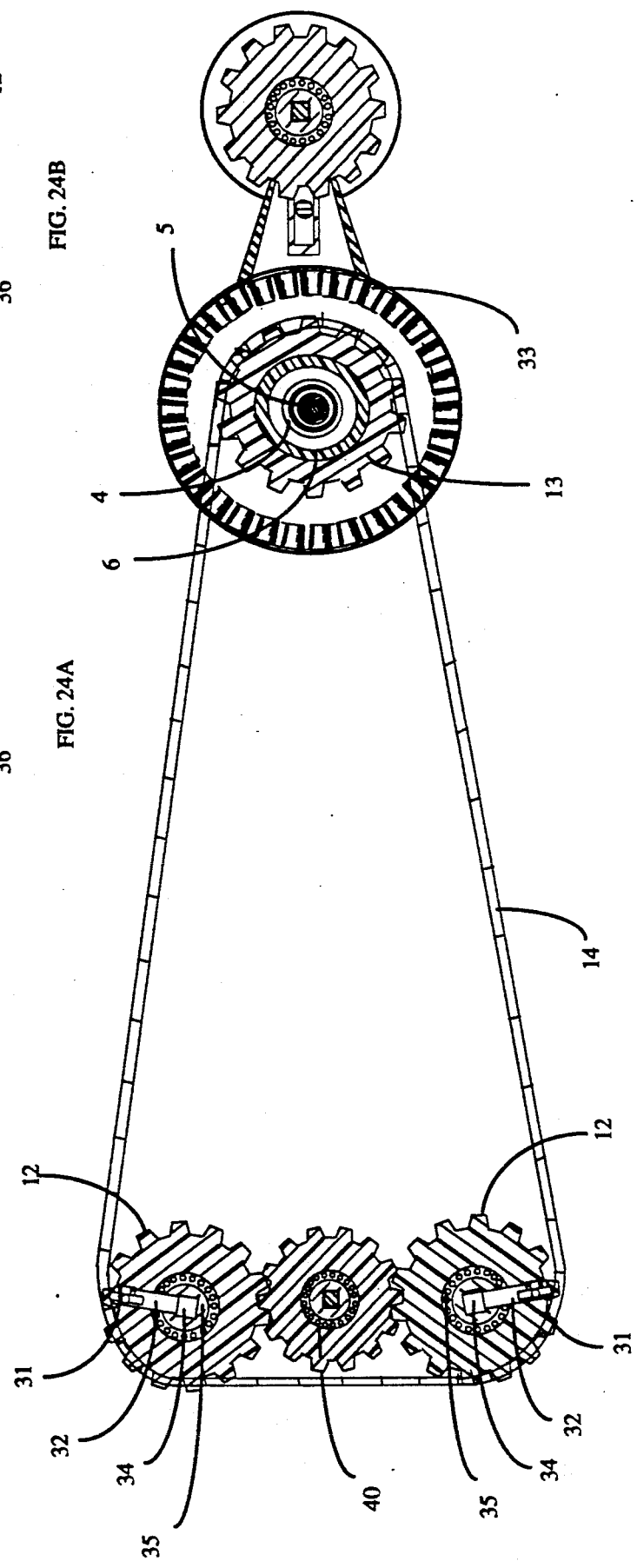
FIG. 25 is the enlarged partially exposed top view of the driving mechanism as shown in FIG. 7.

FIG. 20, FIG. 21, FIG. 22 and FIG. 23 show the detailed structure of the propelling mechanism. FIG. 20 is the enlarged cross-section of the driving mechanism taken along the cross section at the line Y—Y in FIG. 3. FIG. 21 is the enlarged cross-section of the driving mechanism taken along the cross section at the line X—X in FIG. 3. The revolving platform 70 mounts on the roller bearing 33. The blades of the water turbine 7 are integrated to be one unit with the revolving platform 70. The mast 4 is inserted and locked with the guiding tube 6. The bearing 49 holds the axle 5 in the vertical position. Referring to FIG. 20, at the bottom of the axle 5 is the shift screw 46. As the wind blows on the revolving sail 2, the pole 3 rotates the axle 5. With the shift screw 46, the clockwise rotation of the axle 5 drives the engaging cylinder 44 to engage with the revolving platform 70 to rotate the water turbine 7. FIG. 23 and FIG. 25 show the enlarged top views of two different designs of the single sided pedal driving mechanisms. FIG. 24 is the cross section views of pedals taken along the line N—N in FIG. 23. In FIG. 24(B), the pedal is folded up and pushed into the board. In FIG. 24 (A), the pedal 31 is pulled out of the board 1 and in the operating position. The rider steps on the pedal 31 to to rotate the crank link 32. The crank link 32 rotates the square shaft 34 and the bevel gear 12. In FIG. 23, the bevel gear 12 drives the idle gear 13 directly. The shift screw 43 is notched on the tube portion of the idle gear 13. The rotation of the shift screw 43 drives the engaging cylinder 43 to engage with the revolving platform 70 and drives the revolving platform 70 to rotate. FIG. 22 is taken at the cross section W—W in FIG. 21. The tongue 39 is fixed to the nozzle 8 and the tongue 39 slides inside the slot of the guiding groove 37. To change the propelling direction, the lock handle 50 may raise up and the lock is released. Swiveling the handle 50, the link bar 51 rotates the shaft 38 and the guiding groove 37. As the groove 37 swivels, the nozzle 8 swivels, too. The water jet changes direction so that the serve board 1 may change direction. As the direction is fixed, the lock handle 50 is pushed downward to lock position of nozzle 8.

The alternative way to change the propelling direction is to have the shaft 38 rotate a plate. The plate is outside the exit of nozzle 8 to deflect the waterjet. In such an alignment, the nozzle 8 is fixed. This plate is separated into two portions with the pivotal shaft 38. The rear portion of this plate is slightly longer than the front portion of the plate. The plate has the tendency to return to the neutral position and the twisting force on the shaft 38 is also minimized. The rotation of the water turbine 7 will expels the water out of the exit of the nozzle 8 and suck the water from the inlet.

Figure 5:
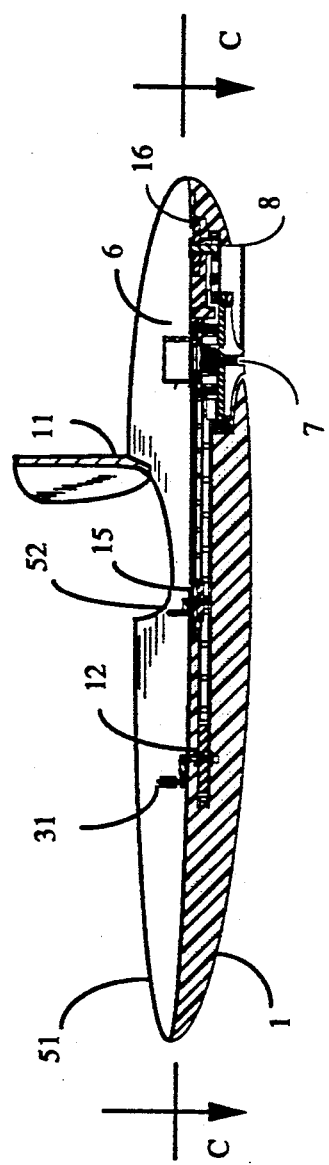
FIG. 5 is the partial exposed section view of surf board equipped with canoe cover; the seat back is in the raising up position.
Figure 6:
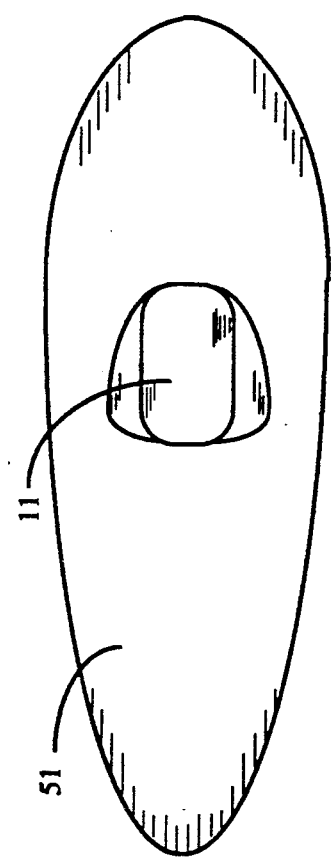
FIG. 6 is the top view of the surf board in the form of canoe; the seat back is in the folded position.

Referring to FIG. 5, the Tangs surf board is equipped with the canoe cover 51. The canoe cover 51 can be separated from the board 1. The cover 51 is added to protect the rider in the tough weather and/or sailing conditions. The seat back 11 can be raised up to be the reclining seat as shown in FIG. 5. As the seat back 11 is closed, the canoe becomes a board as shown in FIG. 6. The canoe is propelled with the water jet. As shown in FIG. 7, FIG. 24 and FIG. 25, the rider steps on the pedals 31 to crank the gears 12. The gears 12 pulles the chain 14. The chain 14 pulls the gear 13 to rotate. The gear 13 drives the blades of water turbine 7 to rotate. The water turbine 7 sucks the water into the housing and builds up the water pressure. This water pressure expels the water through the nozzle 8 and the water pressure is transformed into the water velocity. To change the propelling direction, the nozzle 8 may swivel to change the propelling direction. The rider turns the handle 52 with right hand to rotate the gear 15. The gear 15 pulls the flexible chain 64 to rotate the gear 16. As shown in FIG. 8, FIG. 22 and FIG. 25, the gear 16 turns the shaft 38, groove 37 and the nozzle 8.

FIG. 9 is the Tangs surf board in the form of sail boat. It is the hybrid of the surf board and the canoe in FIG. 1 and FIG. 5. It can use as sail boat, wind surf board, wind surfboat or canoe. The revolving sail 2 is installed at the tail of the board 1. Passing through the canoe cover 51, the mast 4 is inserted in the guide tube 6. As shown in FIG. 9, with the seat back 11 being opened, the rider may sit inside the canoe. As shown in FIG. 10, with the seat cover being closed, the canoe is used as a board. The rider may stand or sleep on the canoe cover 51. In FIG. 10, the water wings 9 are in the extended position; in FIG. 11, the water wings 9 are in the closed position.

As shown in FIG. 21, the direct transmission bar 67 is pulled up. There is no direct transmission between the revolving sail 2 and the water turbine 7. If the rotational speed of platform 70 is faster than the driving speed of engaging cylinders 43 and/or 44, the engagement of engaging cylinders 43 and/or 44 is released. With these engaging mechanisms, the board 1 may have both the wind power and man power to propel it simultaneously. With the addition of man power to the wind power, the board 1 may steer into the wind directly.

The handle 41 has the fork end to grasp the sliding pulley 42. The sliding pulley 42 is hinged to the transmission bar 67. Pushing the handle bar 41 downward, the sliding pulley 42 and the transmission bar 67 are dragged downward. The direct transmission bar 67 is inserted in the slot 66 on the platform 70 as shown in FIG. 20. If the day is hot and there is no wind, the rider steps on the pedals 31 to rotate the gears 12 and 13, engaging cylinder 43, platform 70, direct transmission bar 67, axle 5, pole 3 and the revolving sail 2. The sails 23 serve as the fan to breeze the wind on the rider. The revolving sail 2 and the umbrella cover 68 offer the best rest place in the hot days.

Figure 26:
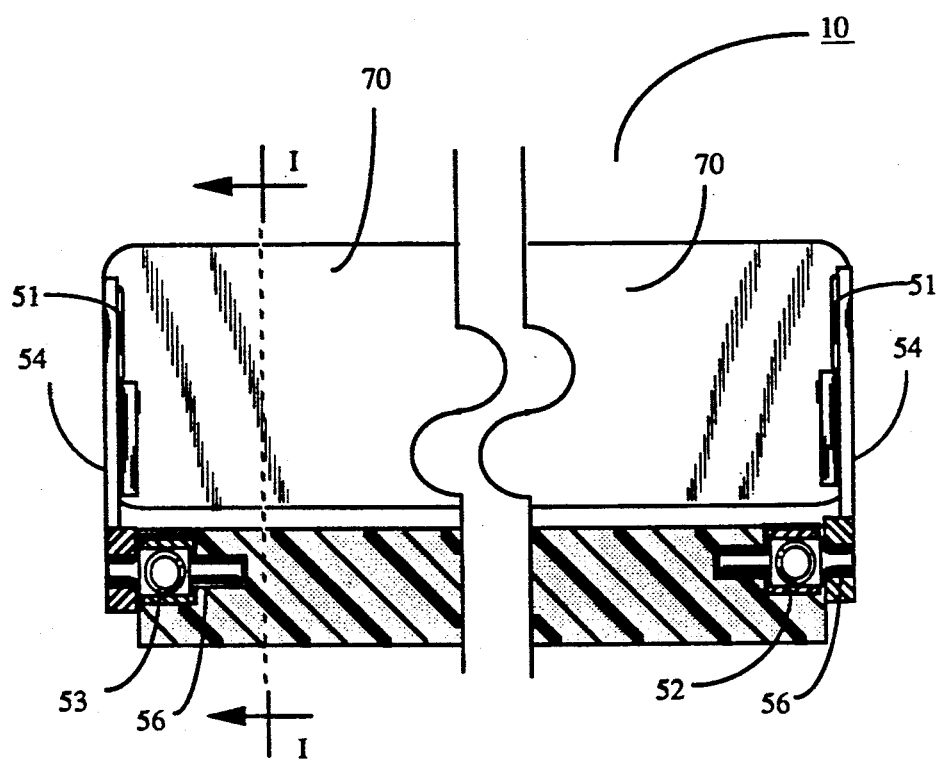
FIG. 26 is the partially exposed composite section views of the foldable seat taken separately at the lines L—L and R—R in FIG. 27.
Figure 27A:
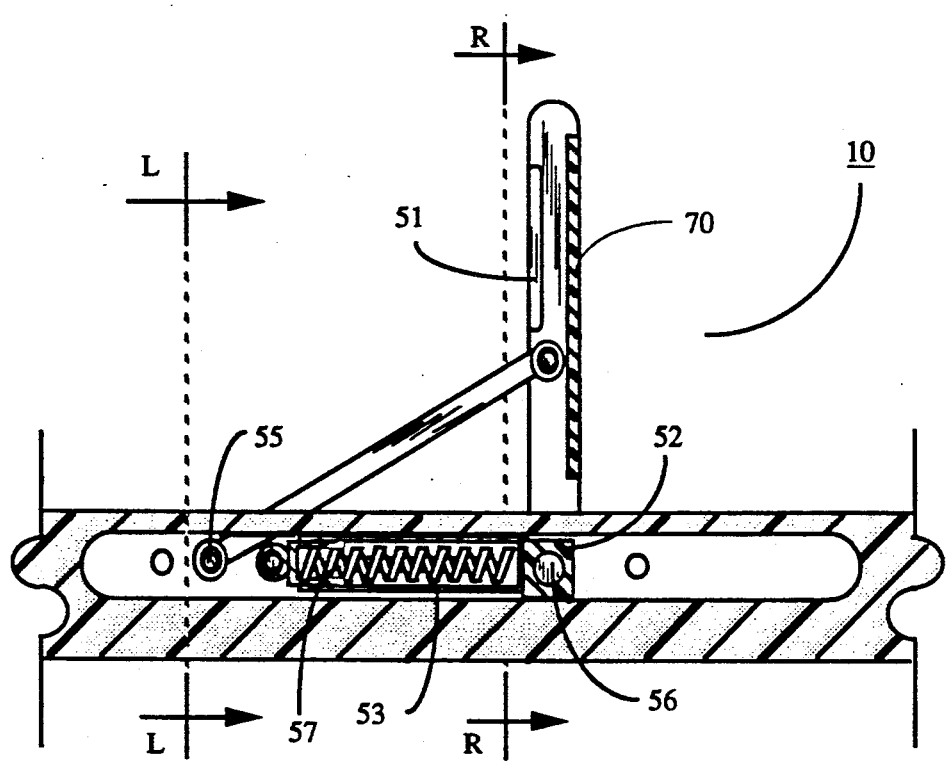
FIG. 27 (A) is the partially exposed section view of the foldable seat in the raised up position taken along the I—I line in FIG. 26; (B) is the partial exposed side view of the foldable seat in the folded position.
Figure 27B:
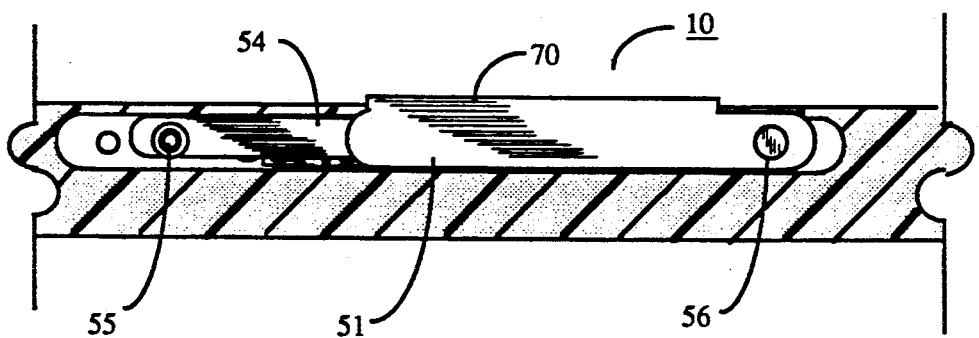

FIG. 26 is the composite partial exposed views of the folding chair 10. The left portion of FIG. 26 is taken at line L—L in FIG. 27(A); the right portion is taken at the line R—R in FIG. 27(A). FIG. 27(A) is the side view taken at the line I—I in FIG. 26. In FIG. 27 (A), the seat back 70 of rest seat 10 is in the upward position. The sliding block 52 slides inside the slot. The pin 56 inserts through the seat and sliding block 52. The coil spring 57 locates inside the tube 53. The coil spring expands against the sliding block 52 and the bottom end of the rest seat 10. FIG. 27(B) is the side view of the back rest 10 in the folded up position. The rim 51 clasps the brace bar 54 to lock the foldable seat 10.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A wind propelled apparatus comprising a floating body and a revolving power conversion mechanism, said revolving power conversion mechanism comprising a revolving sail, a pole, a plurality of cantilevers and propelling means, said plurality of cantilevers being supported by said pole, said pole being rotationally mounted on a mast of said floating body, said revolving sail comprising a plurality of flexible sails, each flexible sail being attached to one of said cantilevers, in any wind direction, said flexible sails receiving differential wind force and resulting in a revolving motion, said revolving motion being transmitted to said propelling means to propel said floating body.

2. A wind propelled apparatus according to claim 1, wherein an umbrella cover is over said cantilevers, said umbrella cover and said cantilevers transmitting a rotational torque to said pole.

3. A wind propelled apparatus according to claim 1 wherein said revolving sail is foldable, said cantilevers being pivotally supported by said pole.

4. A wind propelled apparatus according to claim 3, wherein said cantilevers extend horizontally as a coil spring expands, said coil spring being clamped by a fixed spring retainer and a sliding spring retainer mounted to said pole, said fixed spring retainer attached at a top end of said pole, each of said cantilevers being hinged to a sliding ring and pivoted at a rocker arm, said rocker arm being hinged to said sliding spring retainer and one of said cantilevers and being pivoted at a stirrup, said stirrup being hinged to said rocker arm and said fixed spring retainer.

5. A wind propelled apparatus according to claim 1, wherein each of said plurality of flexible sails is braced with a swiveling link and hinged to one of said cantilevers, said sails swiveling between a vertical position and a horizontal position in different wind directions and resulting in a differential force to make said revolving motion.

6. A wind propelled apparatus according to claim 1, wherein a handle is attached to said mast for a rider to hold for balance, the height of said handle being adjustable.

7. A wind propelled apparatus according to claim 1, further comprising a plurality of water wings with retractable damper fins and a plurality of rest seats, said water wings mounted on sleeve tubes being installed on two sides of said floating body to counter an overturning torque, said retractable damper fins being attached between said floating body and said water wings, said rest seats being foldable and being mounted on said floating body.

8. A wind propelled apparatus according to claim 1, wherein said propelling means comprises a horizontal water turbine, said pole of said revolving power conversion mechanism rotating a shaft of said water turbine to rotate said horizontal water turbine expelling water through a water nozzle to propel said floating body, said water turbine being horizontally rotationally mounted inside of said floating body.

9. A wind propelled apparatus according to claim 8, wherein said water turbine comprises a driving disk, blades and a nozzle, water being drawn into said water turbine, said water turbine expelling the water to propel said floating body, said blades being integrated as one unit with said driving disk, said blades expelling water through said nozzle to propel said floating body.

10. A wind propelled apparatus according to claim 8, wherein a bottom side of a front portion of said floating body is concave upward to increase the amount of water drawn into said water turbine and to increase a lift to said floating body, the direction of said floating body being changeable by turning a water nozzle.

11. A wind propelled apparatus comprising a revolving sail, an umbrella cover, a water turbine and a floating body, said umbrella cover covering said revolving sail, said revolving sail converting wind energy into a revolving motion of said water turbine to propel said floating body, said revolving said mounted on said floating body and comprising a pole, a spring, a plurality of cantilevers with a flexible sail attached to each cantilever, said umbrella cover also covering said cantilevers, said cantilevers tilting upward such that rain water flows toward said pole, the inside of said pole having a conduit to drain said rain water, said spring enabling said cantilevers to extend horizontally, said flexible sail being in the shape of a parafoil, said pole of said revolving said being rotationally mounted on a fixed mast, a handle being attached to said mast of said revolving sail for a rider to hold for balance, the height of said handle being adjustable, said handle being rotationally installed on said mast, said water turbine being horizontally aligned within said floating body.

12. A man-powered propelling system comprising a single sided pedal system such that two pedals are both on the same side of an idle gear, a plurality of foldable seats, a propelling apparatus and a board, said single sided pedal system comprising said two pedals cranking two driving gears to drive said idle gear to rotate, said idle gear being rotationally engaged with said two driving gears, said propelling apparatus being engaged with said idle gear to rotate and thus to propel said board by a rider rotating said pedals, said foldable seats being attached to said board, wherein said two driving gears drive said idle gear with a belt transmission.

13. A man-powered propelling system as claimed in claim 12, wherein said propelling apparatus is a water turbine.

14. A man-powered propelling system according to claim 13 further including a cover clasping said board to form a canoe.

15. A man-powered propelling system according to claim 13, wherein said two pedals are foldable, a rotational shaft of each said pedal being slidable to be pushed into a folded position.

16. A man-powered propelling system according to claim 13, wherein ratchet means are used between said propelling apparatus and said idle gear to enable said propelling apparatus to rotate in a single direction.

17. A man-powered propelling system according to claim 13, further including a revolving sail inserted in a guided tube mounted on said board, said revolving sail rotating said water turbine as the wind blows on said revolving sail, a transmission mechanism allowing said revolving sail and said single sided pedal system to work together to drive said water turbine.

18. A combination wind-powered and man-powered floating apparatus comprising a revolving sail, propelling apparatus, a single sided pedal system such that two pedals are both on the same side of an idle gear, and a floating body, said revolving sail being mounted on a guiding tube mounted on said floating body, said revolving sail transferring wind power to said propelling apparatus, said single sided pedal system transferring man power to said propelling apparatus, a transmission mechanism keeping said revolving sail and said single sided pedal system working together to drive said propelling apparatus, wherein said propelling apparatus is a water turbine, further comprising an umbrella cover, a plurality of foldable reclining seats, and a plurality of extendable water wings with damper fins, said revolving sail being attached to said umbrella cover, said foldable reclining seats being attached to said floating body, said water wings being mounted on two sides of said floating body to increase the stability of said floating body.

19. A combination wind-powered and man-powered floating apparatus as claimed in claim 18, wherein said revolving sail comprises a plurality of cantilevers hinged to a sliding ring and pivoted at a pivot link, a rim of said umbrella cover tilting upward, said revolving sail rotating a driving pole, a locking cam locking a transmission axle with said driving pole to transmit a rotational torque, said transmission axle being rotationally mounted inside a fixed mast, said mast being mounted inside a guiding tube in said floating body, the inside of said mast having a conduit to drain rain water, at the bottom of said transmission axle is a shift screw, said shift screw shifting a first engaging block to engage a platform on said water turbine, said single sided pedal system comprising two pedals cranking two driving gears to drive an idle gear to rotate, said pedals being foldable and lockable, said idle gear being rotationally mounted on said guiding tube and having a second shift screw said second shift screw driving a second engaging block to engage with said platform of water turbine, said platform of said water turbine being rotationally mounted beneath said floating body, said engaging blocks driving said water turbine to cause the water turbine to rotate in the same direction, a handle being rotationally installed on said mast of said revolving sail for the rider to hold for balance, the height of said handle being adjustable, each of said foldable reclining seats having a foldable and removable seat back, said extendable water wings sliding in sleeve tubes to increase the stability of said floating body, said water wings being mounted on either side of said floating body, said damper fins retractably attached between said floating body and said water wings.

20. A combination wind-powered and man-powered floating apparatus according to claim 19 wherein said revolving sail has foldable flexible sails in the shape of a parafoil, said flexible sails being attached to said umbrella cover.

21. A combination wind-powered and man-powered floating apparatus according to claim 19 wherein said revolving sail comprises foldable flexible sails, each being braced with a swiveling link hinged to a cantilever.

22. A combination wind-powered and man-powered floating apparatus according to claim 19 wherein a nozzle of said water turbine is rotatable to change direction of ejected water, a handle to rotate said nozzle being foldable and lockable.

23. A combination wind-powered and man-powered floating apparatus according to claim 19 wherein a deflection plate changes the direction of said water turbine of ejected water, a handle for said deflection plate being foldable and lockable.

24. A combination wind-powered and man-powered floating apparatus as claimed in claim 18 further comprising a removable cover, said cover clasping, engaging and being locked with said floating body to form a canoe, a seat back being installed on said cover said seat back when raised serves as a seat back, and said seat back when down defining the top of a storage space.

25. An umbrella comprising a pole with a top, a plurality of cantilevers and an umbrella cover, said umbrella cover covering said cantilevers, said cantilevers tilting upward so that rain water flows toward said pole, said pole having a conduit to drain said rain water therein, said umbrella being opened automatically with a spring, said spring being a coil spring secured by a fixed spring retainer and a sliding spring retainer, said fixed spring retainer secured at the top of said pole, said sliding spring retainer being mounted on said pole, said cantilevers being hinged to a sliding ring on said pole, a plurality of rocker arms, each being hinged to said cantilevers and said sliding spring retainer, and a plurality of stirrups, each stirrup being hinged to said rocket arm and said fixed spring retainer.

26. A floating apparatus comprising an umbrella and a floating body, said umbrella comprising an umbrella cover, a plurality of cantilevers and a pole, said umbrella cover being over said plurality of cantilevers of said umbrella, said plurality of cantilevers tilting upward so that rain water flows toward said pole, said pole being inserted in a guide tube on said floating body, said pole having an inner conduit to drain the rain water to flow underneath said floating body, said umbrella being removable from said floating body, and, wherein said umbrella has a spring to enable said plurality of cantilevers to extend horizontally and automatically, said spring being secured by a fixed spring retainer and a sliding spring retainer, said plurality of cantilevers being hinged to the spring sliding on said pole and being pivoted at a plurality of rocker arms, a stirrup being hinged to each of said plurality of rocker arms and a fixed spring retainer secured at a top end of said pole, said rocker arms being hinged to the sliding spring retainer on said pole.

* * * * *